US012039480B2

(12) United States Patent
Vescio

(10) Patent No.: US 12,039,480 B2
(45) Date of Patent: Jul. 16, 2024

(54) SYSTEM, METHOD, AND APPARATUS FOR MEASURING, MODELING, REDUCING, AND ADDRESSING CYBER RISK

(71) Applicant: Secure Systems Innovation Corporation, Reston, VA (US)

(72) Inventor: Robert Vescio, Reston, VA (US)

(73) Assignee: Secure Systems Innovation Corporation, Reston, VA (US)

( * ) Notice: Subject to any disclaimer, the term of this patent is extended or adjusted under 35 U.S.C. 154(b) by 0 days.

(21) Appl. No.: 17/964,426

(22) Filed: Oct. 12, 2022

(65) Prior Publication Data

US 2023/0122830 A1 Apr. 20, 2023

Related U.S. Application Data

(60) Provisional application No. 63/256,105, filed on Oct. 15, 2021.

(51) Int. Cl.
*G06Q 10/0637* (2023.01)
*G06Q 10/0635* (2023.01)

(52) U.S. Cl.
CPC ... *G06Q 10/06375* (2013.01); *G06Q 10/0635* (2013.01)

(58) Field of Classification Search
None
See application file for complete search history.

(56) References Cited

U.S. PATENT DOCUMENTS

| 10,395,201 B2 * | 8/2019 | Vescio | H04L 63/1425 |
| 11,228,616 B2 * | 1/2022 | Khan | G06F 21/554 |
| 2006/0218640 A1 * | 9/2006 | Lotem | G06F 21/577 |
| | | | 726/25 |

(Continued)

FOREIGN PATENT DOCUMENTS

| AU | 2020267266 A1 * | 6/2021 | |
| EP | 3131261 A1 * | 2/2017 | H04L 63/14 |
| JP | 2020155098 A * | 9/2020 | G06N 5/04 |

OTHER PUBLICATIONS

Yohanandhan, Rajaa Vikhram, et al. "Cyber-physical power system (cpps): A review on modeling, simulation, and analysis with cyber security applications." IEEE Access 8 (2020): 151019-151064. (Year: 2020).*

(Continued)

*Primary Examiner* — Thomas L Mansfield
(74) *Attorney, Agent, or Firm* — Maier & Maier, PLLC

(57) ABSTRACT

A computer-implemented method of identifying and mitigating information security risks may be provided. The method may involve an operator receiving control implementation inputs and historical and cyber risk intelligence control effectiveness data and combining the historical and cyber risk intelligence control effectiveness data and the operator control implementation input to determine a control effectiveness measurement for each of a plurality of risk scenarios. The determined control effectiveness measurement results may be aggregated for each of a plurality of controls for the plurality of risk scenario, a control effectiveness simulation model may be generated, and a control effectiveness simulation model summary may be outputted.

20 Claims, 8 Drawing Sheets

(56) References Cited

U.S. PATENT DOCUMENTS

| | | | |
|---|---|---|---|
| 2015/0288712 A1* | 10/2015 | Jones | H04L 63/1433 |
| | | | 726/25 |
| 2018/0068243 A1* | 3/2018 | Vescio | G06Q 10/0635 |
| 2019/0052664 A1 | 2/2019 | Kibler et al. | |
| 2019/0260795 A1* | 8/2019 | Araiza | H04L 51/212 |
| 2020/0304534 A1* | 9/2020 | Rakesh | H04L 63/1433 |
| 2021/0021636 A1 | 1/2021 | Sbandi | |
| 2021/0133331 A1 | 5/2021 | Lipkis et al. | |
| 2021/0273960 A1* | 9/2021 | Humphrey | G06N 7/01 |
| 2021/0360032 A1* | 11/2021 | Crabtree | G06F 16/2477 |

OTHER PUBLICATIONS

Xiong, Wenjun, and Robert Lagerstrom. "Threat modeling—A systematic literature review." Computers & security 84 (2019): 53-69. (Year: 2019).*

Zhang, Qi, et al. "A fuzzy probability Bayesian network approach for dynamic cybersecurity risk assessment in industrial control systems." IEEE Transactions on Industrial Informatics 14.6 (2017): 2497-2506. (Year: 2017).*

Kavak, Hamdi, et al. "Simulation for cybersecurity: state of the art and future directions." Journal of Cybersecurity 7.1 (2021): tyab005. (Year: 2021).*

Becue, Adrien, Isabel Praça, and João Gama. "Artificial intelligence, cyber-threats and Industry 4.0: Challenges and opportunities." Artificial Intelligence Review 54.5 (2021): 3849-3886. (Year: 2021).*

International Search Report and Written Opinion issued on Jan. 31, 2023, in corresponding International Application No. PCT/US2022/046514, 7 pages.

\* cited by examiner

SYSTEM, METHOD, AND APPARATUS FOR MEASURING, MODELING, REDUCING, AND ADDRESSING CYBER RISK

BACKGROUND

A major aspect of risk management for businesses and other institutions is the question of how cyber security and other information system resources should be allocated. Many types of businesses and other institutions face markedly different cyber security and information system threats and potential harms, and cyber security as well as risk managers of these institutions must be able to prioritize their cyber security and information systems resources based on what they anticipate being the most serious and harmful threats to their operations. Improperly prioritizing resources toward fending off lower-priority threats risks wasting those resources and leaves inadequate resources available for dealing with higher priority threats.

Existing characterizations of the cyber risk financial exposure faced by a business or other institution are typically drawn from highly subjective resources, such as questionnaires provided to certain people within the business, loose correlations to news-worthy cyber incidents (such as the Equifax data breach financial impact), or the intuition of consulting experts.

What models exist are typically based on value-at-risk (VaR) models that are most commonly used by banks, other financial institutions, and consulting firms. Analytical VaR, historical simulation VaR, and Monte Carlo simulation VaR are examples of such models. The VaR models are not perfect and each of them draw upon assumptions which make their returns not entirely suitable for understanding financial exposure due to cyber risk.

Analytical VaR and Monte Carlo VaR calculations assume that cyber risk financial impacts are normally distributed. In reality, however, cyber risk financial impacts are not normal, and have tendencies of skewness and leptokurtosis. Historical simulation VaR is another option. This option can be more accurate if the cyber risk financial impacts are non-normal. However, this option requires a huge amount of historical data, which is generally not acquired for such simulations. Even if the data is available, it may not be directly usable because the financial impacts due to cyber are based on historical weights and cost elements. The historical weights and cost elements create a flaw in the simulation since weights and costs structures will look different at different times in history.

Despite the current choices, methods, and models, used by businesses and other institutions to characterize their cyber risk financial exposure or to not characterize their cyber risk financial exposure, the evidence is clear that cybersecurity failures are a global concern. The World Economic Forum's "The Global Risks Report 2021, 16th Edition" lists cybersecurity failures as a clear and present danger with above average likelihood and above average impact. Businesses and other institutions can no longer rely on arbitrary values (such as risk ratings) to make informed cyber risk management decisions. Businesses and other institutions need the ability to understand cyber risk in financial terms to properly prioritize remediation efforts, purchase adequate risk transfer options (such as cyber insurance), better negotiate indemnification, warranty, and liability clauses with third parties and supply chain members, accurately inform shareholders and other constituents of possible financial impacts post cyber incident, understanding which business units are the most risky, knowing which mergers and acquisitions to avoid if the financial exposure due to cyber risk is outside of risk tolerance, and many other strategic risk management decisions.

SUMMARY

Embodiments of the invention relate generally to systems, methods, and apparatuses for assessing cyber risk within an enterprise environment, more particularly to augmenting modeling calibration by including additional data, such as historical data, cyber risk intelligence data, and enterprise-specific data, in the overall threat, impact, control, and incident data sets, by using a series of automated simulations to pinpoint and prioritize risk reduction, and by using trend analysis to address cyber risk within the context of the enterprise's risk resilience journey.

In an exemplary embodiment, a system, method, and apparatus for assessing cyber risk may be used to improve performance of one or more systems, applications, information-technology-based processes, or other enterprise profiles (such as a business unit) by improving the efficiency of finite resource allocation to address various threats to one or more systems, applications, information-technology-based processes, or other enterprise profiles (such as a business unit) and improving the quality of information used to manage threats.

In an exemplary embodiment, an enterprise operator(s) may provide input elements within the measurement section and react to outputs provided within the reducing and addressing sectors. The entire system, method, and apparatus, when built within, for example, a Software as a Service (SaaS)-based application, may provide a means of automation that closely aligns with an ever-changing threat velocity, and may provide an enterprise with a means to allocate finite budget and other finite enterprise resources during the entire risk resilience journey.

BRIEF DESCRIPTION OF THE FIGURES

Advantages of embodiments of the present invention will be apparent from the following detailed description of the exemplary embodiments. The following detailed description should be considered in conjunction with the accompanying figures in which.

Exemplary

Exemplary

Exemplary

Exemplary

Exemplary

Exemplary

Exemplary

Exemplary

DETAILED DESCRIPTION OF THE EMBODIMENTS

Figure 1:
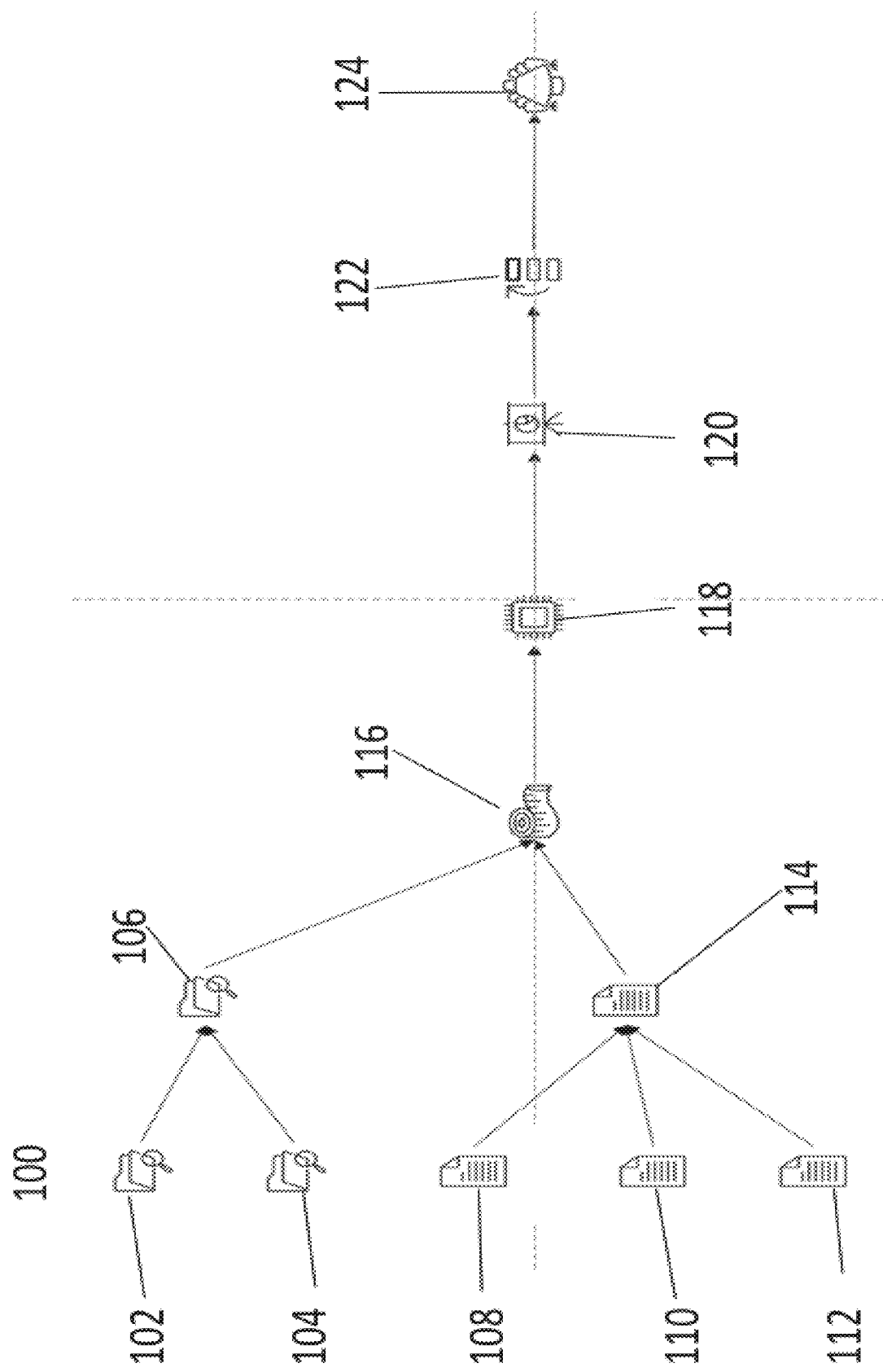
FIG. 1 is an illustration of an overview of an exemplary system, method, and apparatus for measuring, modeling, reducing, and addressing threat.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many embodiments are described in terms of sequences of actions performed by, for example, elements of a computing device. It may be recognized, by those of ordinary skill in the art, that various sequences of actions can be performed by specific circuits (e.g. application specific integrated circuits (ASICs)) and/or by program instructions executed by at least on processor. Additionally, the sequence of actions, described herein, may be embodied within a form of computer-readable storage medium such that execution of the sequence of action enables at least one processor to perform the functionality described herein. Furthermore, the sequence of actions, described herein, may be embodied in a combination of hardware and software assets (such as a SaaS-based platform). Thus, various aspects of present invention may be embodied in several different forms, all of which have been contemplated to be within the scope of the claimed subject matter. In addition, for each of the embodiments described herein, any corresponding embodiments may perform the described action, for example, "a computer configured to".

As used herein "confidentiality" is the degree of privacy or secrecy related to data within an information system, "integrity" is the quality or state of an information system operating in an unimpaired condition, or the quality or state of data being complete and unaltered, and "availability" is the quality or state of an information system or data being available.

In an exemplary embodiment enumerations and structures may be created to provide a means of organization and ensure that modular components connect in a meaningful way. In an exemplary embodiment there may be a threat enumeration and structure that contains, for example, 10 threat categories. Each threat category may have one or more varieties within it. These enumerations may be based on existing systems or use standardized terminology, for example a threat enumeration system may be based on VERIS (Vocabulary for Event Recording and Incident Sharing) or another system such at MITRE ATT&CK. Enumerations and varieties may further be based on other external sources, for example historical data and/or cyber risk intelligence data.

As an example, in a threat enumeration containing 10 threat categories, the categories may include, but are not limited to, web application attack, point of sale intrusion, insider and privileged misuse, miscellaneous error, physical theft and loss, crimeware, physical card skimmers, cyber espionage, Denial-of-Service attack, and/or everything else. Each category may contain one or more varieties, for example the category of web app attack may include the varieties credential stealing, vulnerability exploits, or brute force attacks.

In an exemplary embodiment there may be an asset enumeration. The number of assets may depend on the type of business, or the industry the business is within. These enumerations may be based on existing systems or use standardized terminology, for example the asset enumeration system may be based on VERIS. Enumerations and varieties may further be based on other external sources, for example historical data and/or cyber risk intelligence data may be used to inform group selection and deselection.

As an example, an asset enumeration may include, but is not limited to, servers and applications, networking devices, end user systems, terminals, Industrial Control System (ICS), Supervisory Control and Data Acquisition (SCADA) systems, Operational Technology (OT) Systems, healthcare devices, onboard systems, critical Internet of Things (IOT), non-critical IOT, media and offline data, and/or people.

In an exemplary embodiment there may be a risk scenario enumeration and structure. The risk scenario enumeration may be based on the cross section of a threat category with an asset group. For example, if there are 10 threat categories and 11 asset groups, there may be 110 risk scenarios. For each risk scenario the system, method, process, and apparatus may execute a processing route to determine residual risk using a risk formula, for example the formula $$Risk = Threat \times Impact \times (1 - Control\ Effectiveness).$$

In an exemplary embodiment there may be a control enumeration and structure. The control enumeration may be based on existing systems or use standardized terminology, for example the enumeration may leverage the CIS (Critical Security Controls (version 8)) as a foundational control set in which other control frameworks may align. In other embodiments a different framework may be used, including but not limited to Payment Card Industry Data Security Standard (PCI DSS), National Institute of Standards and Technology Cybersecurity Framework (NIST CSF), Cloud Security Alliance, HIPAA, Systems and Organizations Control (SOC) 2/3, Cybersecurity Maturity Model Certification (CMMC), ISO-27002, North American Electric Reliability Corporation Critical Infrastructure Protection (NERC CIP), Azure Security Benchmark, Criminal Justice Information Services and/or any other framework known to a person of ordinary skill in the art. In an exemplary embodiment one or more frameworks may be mapped to another framework, for example one or more of the above frameworks may be mapped back to CIS CSC to enable more efficient modeling. Additionally, different technology systems may also be mapped back to a control framework, for example technologies like zero trust, vulnerability management, and/or DDOS mitigation services may be mapped onto CIS CSC.

In an example, the control enumeration may include, but is not limited to, inventory and control enterprise assets, inventory and control of software assets, data protection, secure configuration of enterprise assets and software, account management, access control management, continuous vulnerability management, audit log management, email and web browser protections, malware defenses, data recovery, network infrastructure management, network monitoring and defense, security awareness and skills training, service provider management, application software security, incident response management, and/or penetration testing. The controls within the control enumeration may change over time and use and adoption of cybersecurity frameworks may inform changes to the control enumeration.

In an exemplary embodiment there may be a control structure in which each of the controls may intersect with a risk scenario in order to determine or inform control effectiveness or determine a risk reducing quality. historical data and cyber risk intelligence data may also inform that the control has no risk reducing quality for a given intersecting point.

In an exemplary embodiment there may be a loss category enumeration and structure. For example, the loss categories may be, but are not limited to, data breach, business interruption, ransomware, and/or misappropriation. Each loss category may be comprised of a collection of direct losses, indirect losses, and/or opportunity costs. Historical data and cyber risk intelligence data may inform loss category selection, and loss categories may change over time.

In an exemplary embodiment, loss categories may map to specific threat categories and/or specific risk scenarios to determine loss probability. For example, misappropriation may map to web application attacks, insider and privileged misuse, physical theft, and crimeware; while data breach may map to web application attacks, point of sale intrusion, physical card skimming, insider and privileged misuse, and physical theft. Historical data and cyber risk intelligence data may inform loss category to threat category mapping, for the purposes of determining loss probability. A similar process may be followed for mapping loss categories to risk scenarios. Historical data and cyber risk intelligence data may inform loss category to threat category mapping to risk scenario mapping, for the purposes of determining loss probability.

In an exemplary embodiment the system, method, and apparatus for measuring, modeling, reducing, and addressing cyber risk may contain a process for determining threat. The threat system, method, and apparatus may be just one component of the entire system, method, and apparatus for measuring, modeling, reducing, and addressing cyber risk.

FIG. 1 shows an overview of an exemplary system, method, and apparatus for measuring, modeling, reducing, and addressing threat 100. The system for addressing threat 100 may include a data defined industry baseline 102 and a data defined industry threat modifier 104 which may make up historical and cyber risk intelligence threat data 106. The system for addressing threat may further include operator defined industry selection data 108, operator defined asset applicability 110, and operator defined threat modifier data 112, which may make up operator threat input data 114. The historical and cyber risk intelligence threat data 106 and the operator threat input data 114 may be used to determine threat measurements 116. The threat measurements 116 may then be used to produce a threat model 118, which may be displayed as threat results 120, or used to create threat rankings 122. Finally, the threat results 120 and the threat rankings 122 may be used to efficiently address the threat 124.

The threat process may include the data defined industry threat baseline. The industry threat baseline may be based on an industry vertical, and historical and cyber risk intelligence data may be used to determine an annual threat baseline for each industry vertical amongst each of the threat categories. The industry verticals may be based on external sources, for example the verticals may align with NAICS codes. In other embodiments the industry verticals may be SIC industry coding, or individual organizations may be provide their own list of verticals. The industry verticals may include, but are not limited to, Financial and Insurance Services (NAICS Code 512), retail trade (NAICS Code 44, 45), Healthcare (NAICS Code 62), Manufacturing (NAICS Code 31, 32, 33), Accommodation and Food services (NAICS Code 72), Education (NAICS Code 61), Information, software, and technology (NAICS Code 51), Public Administration (NAICS Code 92), Transportation and Warehousing (NAICS Code 48, 49), and/or any other applicable industry verticals. The threat baseline may be determined by leveraging historical and cyber risk intelligence data.

In an exemplary embodiment, a threat baseline may be created by converting incidents to a ratio across each of the threat categories. The ratio may then be standardized by, for example, dividing by the average ratio and then multiplying by 5.

Figure 2:
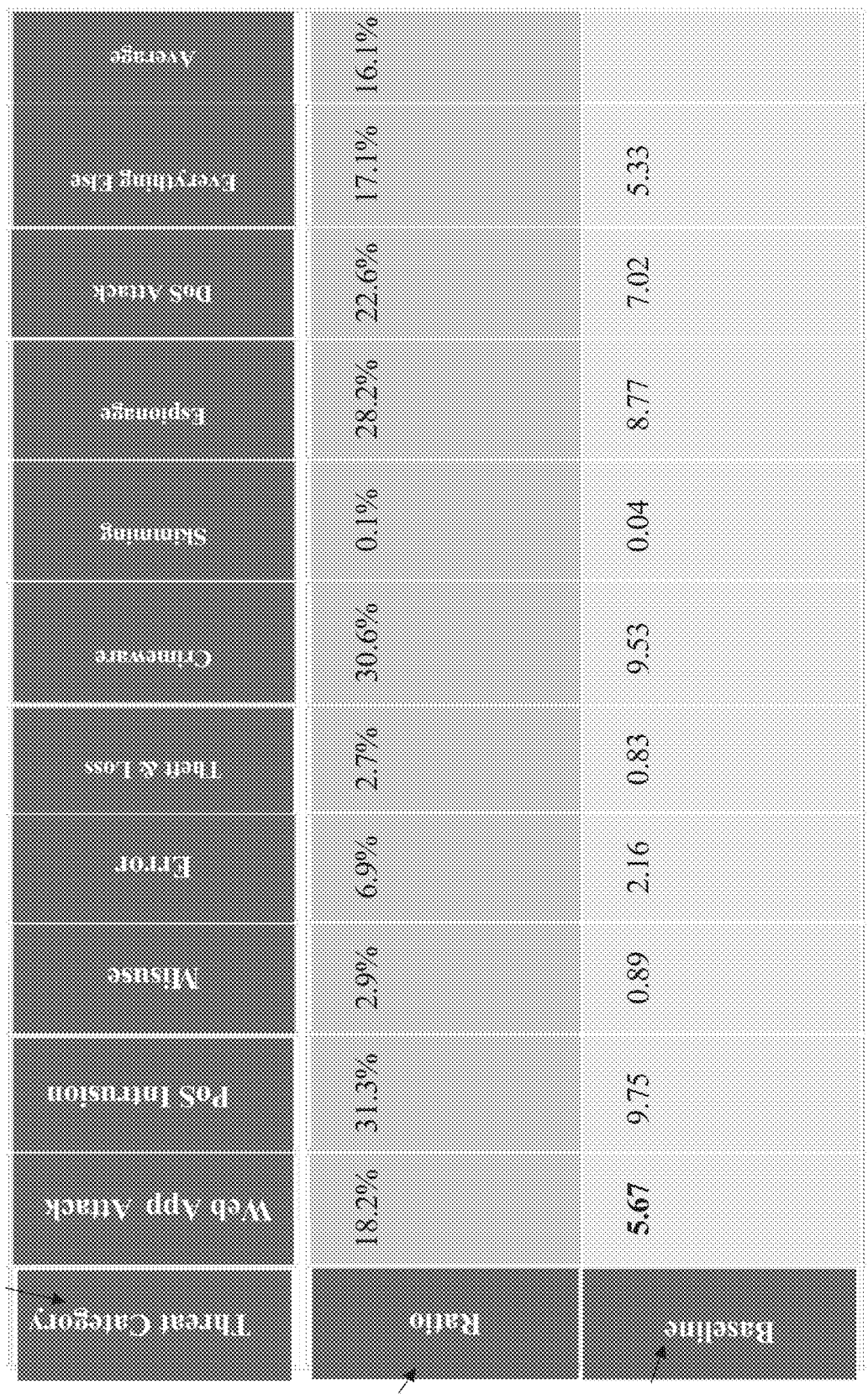
FIG. 2 is an exemplary industry threat baseline table.

FIG. 2 shows an example of an exemplary industry threat baseline 200. The industry threat baseline 200 may have a series of threat categories 202, such as web app attack, POS intrusion, etc. For each threat category 202 there may be a ratio 204 assigned as a percentage value. Based on the ratio 204 each category may be assigned a baseline value 206.

In an exemplary embodiment there may be a data defined industry threat modifier. The data defined industry threat modifier may be determined on a regular basis, for example daily, weekly, monthly, or quarterly, and may be determined for each industry vertical amongst each threat category. Threat modification may be determined at the threat variety by comparing the current volume to a baseline volume. The average amongst all threat varieties, for a given threat category, may determine the total threat modification for that threat category.

Figure 3:
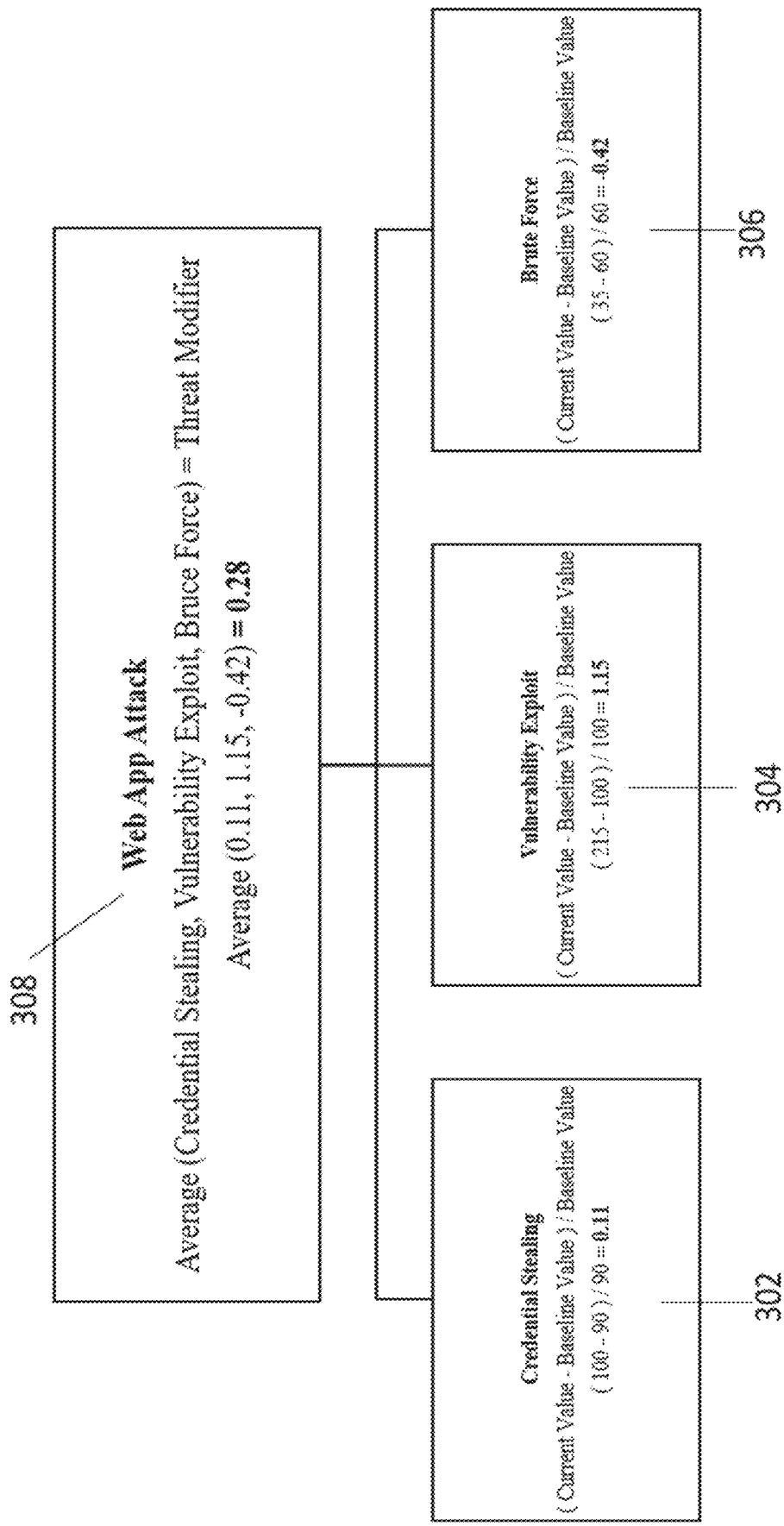
FIG. 3 is an illustration of an exemplary industry threat modification calculation.

FIG. 3 shows an exemplary industry threat modification example 300. The threat modification 300 may have a number of threat varieties, for example credential stealing 302, vulnerability exploit 304, and brute force attacks 306. For each variety there may be a current number of incident values, which may be defined by the number of that kind of incident which occurred in a specified time period, for example the previous quarter or year. As an example, credential stealing 302 may have a current incident value of 100. Each variety may also have a baseline incident value, for example credential stealing 302 may have a baseline value of 90. Threat modification for a variety may be determined by a formula, such as, ((current value−baseline value)/baseline value), for example credential stealing 302 would have a threat modification value of ((100−90)/90) =0.11. The threat modification values of the varieties may be combined to determine a total threat modification value, for example if credential stealing 302=0.11, vulnerability exploit 304=1.15, and brute force 306=−0.42, then the total web app attack threat modification 308 may be found by, for example, averaging (0.11, 1.15, −0.42) and getting a value of 0.28.

In other exemplary embodiments the threat modifications values may be combined in some other fashion, such as by addition or as a weighted average.

In an exemplary embodiment the threat baseline may be combined with the threat modifier in order to determine a total industry threat level. This process may be repeated for each threat across each industry vertical. The total industry threat may become the new industry threat baseline for future calculations. If the threat modifier is increased beyond a predetermined score threshold, for example a ratio of 10, then a new baseline may be established, likewise if the threat modifier is decreased below a certain score threshold, for example a ratio of 0, then a new baseline may be established.

In an exemplary embodiment, some values may be input by an operator. For example, an operator may input the applicable industry, asset applicability, operator defined threat modifiers, and/or operator threat inputs. This process may be used in addition to other information sources such as historical and cyber risk intelligence data. A final threat measurement may be determined by combining historical and cyber risk intelligence threat data, operator threat input, and any other sources of information. The combination may be an average, weighted average, or some other combination. Threat measurement may be determined for some or all possible risk scenarios and may be combined into a threat measurement grid.

In an exemplary embodiment there may be a threat model. The threat model may be a combination of the threat measurements and a threat asset allocation amongst each of the risk scenarios, to tune the threat for each risk scenario. The asset allocation table may account for the disproportionate threat activity amongst different asset groups. The allocation values may be informed by, for example, historical and cyber risk intelligence data. The threat model my be determined by the multiplication of the threat measurement grid with the asset allocation grid.

In an exemplary embodiment the results of the threat model may be displayed the operator. The model may be used to prepare visual aids of various trends, for example, historical trends, maximum threat per threat category graphs, aggregate threat per threat category graphs, and/or top 5 threat scenarios. These determinations may be made automatically, on a one time or regular basis, and may be made by automatic means such as artificial intelligence. Furthermore, regular determinations may be combined to, for example, generate threat trends based on shifts in historical and cyber risk intelligence threat data and operator defined threat data.

In an exemplary embodiment the threat model may be used to automatically address threat. For example, if a threat is determined to be above a certain threshold value, related assets may be automatically reduced. In another example, if the threat is above a certain threshold value, monitoring or blocking software may be automatically implemented by the system. In other situations, in order to address threat an enterprise may automatically take parts of its network offline such as through DDOS mitigation, may block threat vectors through end point protection, and/or may perform any other threat mitigation technique known by a person of ordinary skill in the art.

In an exemplary embodiment the system, method, and apparatus for measuring, modeling, reducing, and addressing cyber risk may contain a process for determining impact. The impact system, method, and apparatus may be just one component of the entire system, method, and apparatus for measuring, modeling, reducing, and addressing cyber risk.

Figure 4:
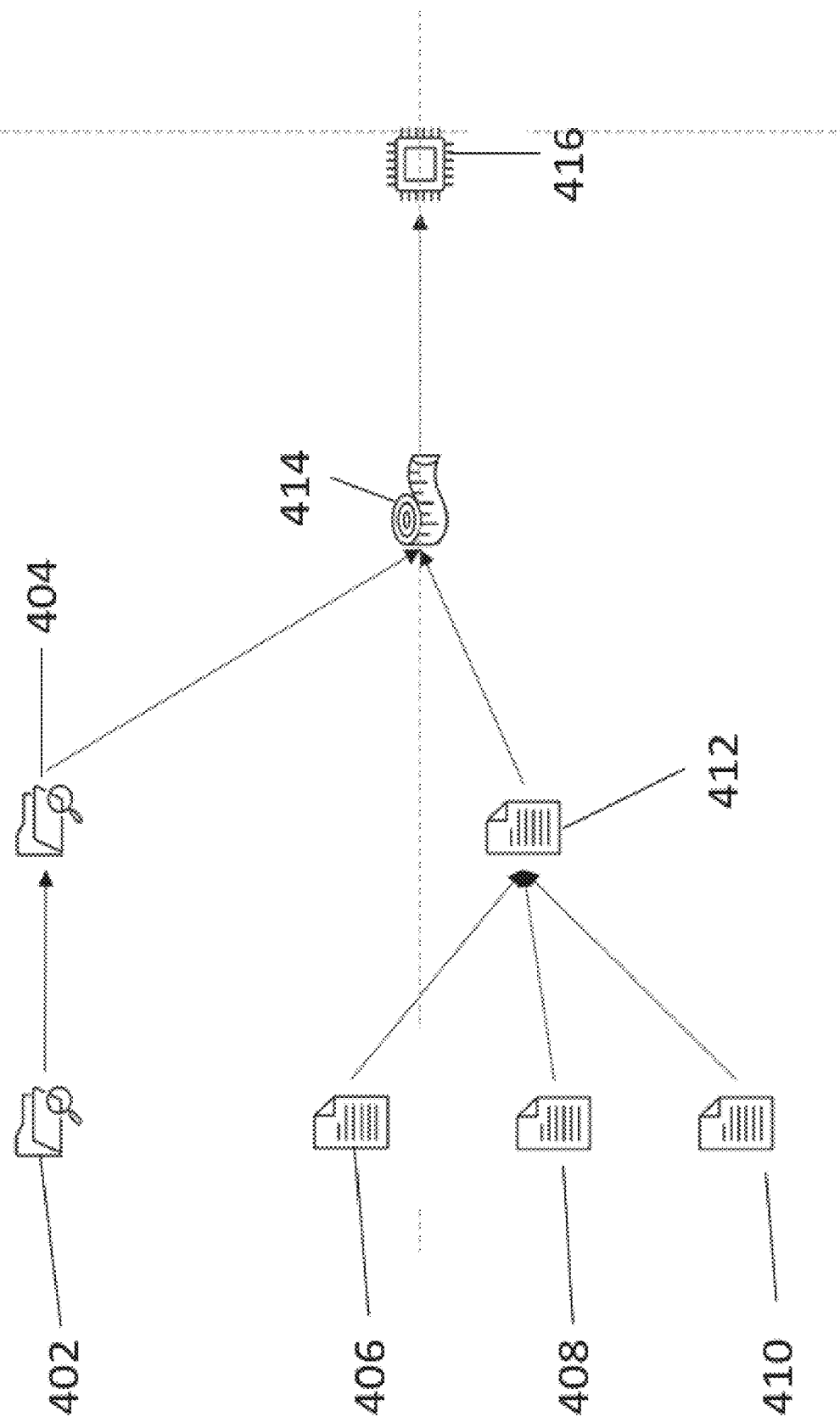
FIG. 4 is an illustration of an exemplary overview of an exemplary system, method, and apparatus for measuring, and modeling impact.

FIG. 4 shows an illustration of an exemplary overview of an exemplary system, method, and apparatus for measuring, and modeling impact 400. The system for modeling impact 400 may have data defined industry impact assumptions 402, which may be used as part of historical and cyber risk intelligence threat data 404. The system for modeling impact 400 may have operator defined industry selection data 406, operator defined asset applicability data 408, and operator defined impact selection data 410, which may all be part of operator impact inputs 412. Intelligence threat data 404 and impact inputs 412 may be used to determine impact measurements 414. The impact measurements may be used to determine an impact model 416.

In an exemplary embodiment the impact determination process may include data defined industry impact assumptions. Confidentiality, integrity, and availability assumptions may be made for each industry vertical, using, for example, historical and cyber risk intelligence data. For each industry there may be an assumption of common asset uptime to determine assumed availability, and there may be a process that combines assumed confidentiality and availability to determine assumed integrity.

In an exemplary embodiment, a first step may involve determining industry impact assumption, historical data and cyber risk intelligence date may be used to determine which assets are common within each industry vertical. As an example, healthcare devices are common in the healthcare industry vertical but are uncommon in the mining industry vertical. If an asset is common with an industry it may be considered "on" and given a value of 1, or some other value to indicate that it is on, while if it is not it may be considered "off" and be given a value of 0, or some other value to indicate that it is off.

In an exemplary embodiment, a second step may involve determining industry impact assumption by using historical data and cyber risk intelligence data to determine the common industry record blend for a particular industry by, for example, converting an industry cost per record value into a confidentiality value. This may be done by, for example, dividing the industry cost per record value by the average cost per record value, and then multiplying by a ratio, such as 5.

In an exemplary embodiment, a third step may involve determining industry impact assumptions by, for example, using historical data and cyber risk intelligence data to determine the common asset uptime. As an example, ICS, SCADA, and OT devices commonly cause noticeable business interruption if they are down for 30 minutes or longer, while end user systems uncommonly cause noticeable business interruption if they are down for 30 minutes or longer. In this case noticeable business interruption at 30 minutes may be set to, for example, an availability value of 10, on a scale of 0 to 10.

In an exemplary embodiment, a fourth step may involve determining industry impact assumption in order to determine industry integrity. Since integrity is directly related to confidentiality and availability the integrity value may be determined by, for example, averaging the confidentiality and availability values. These steps may be repeated for each of the risk scenarios, for each industry.

In an exemplary embodiment, the data defined industry impact assumptions may be combined to determine industry assumed impact.

Figure 5:
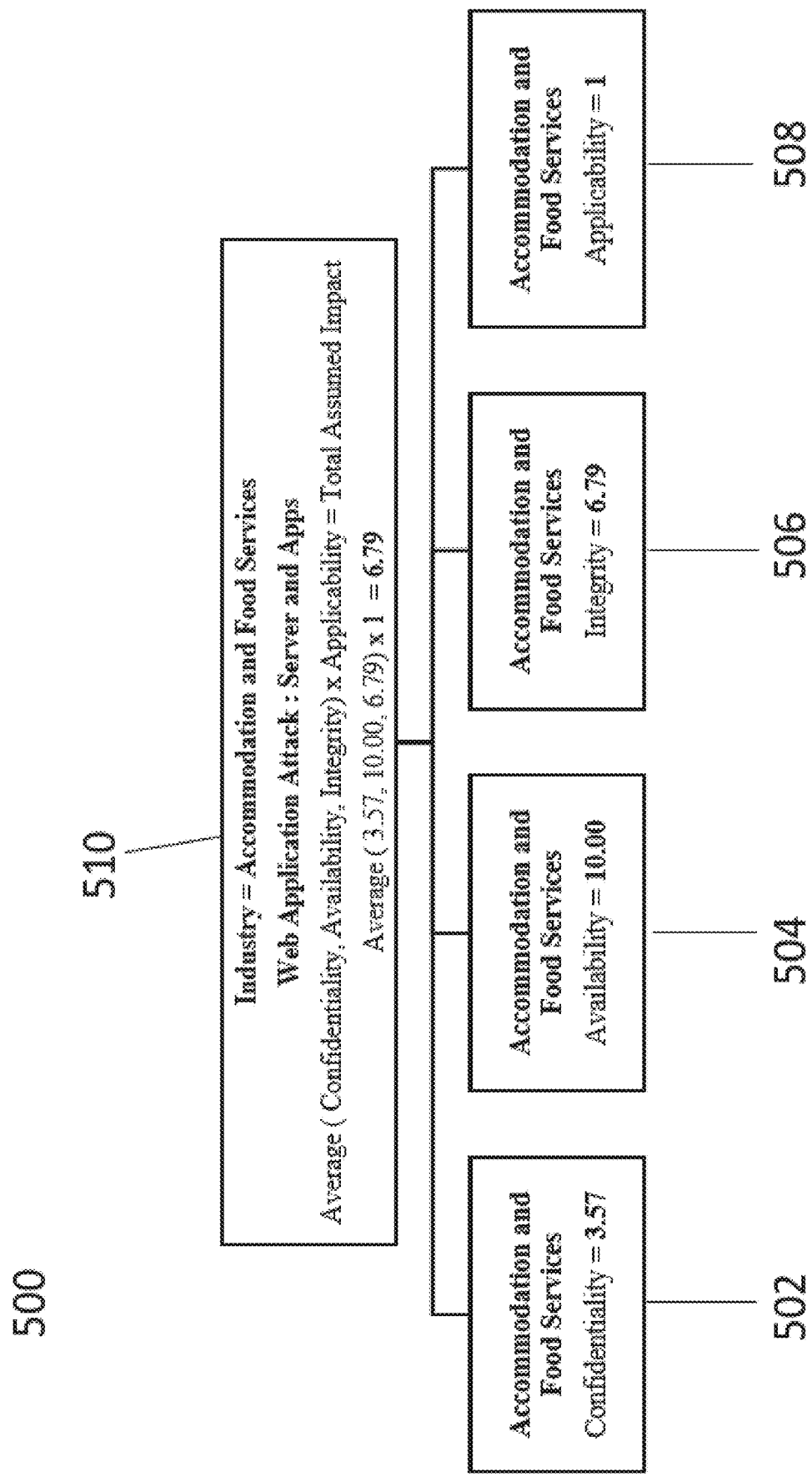
FIG. 5 is illustration of an exemplary industry assumed total impact calculation.

FIG. 5 shows an example of an exemplary industry assumed total impact calculation 500. The industry assumed total impact calculation 500 may have a confidentiality score 502, for example 3.57, an availability score 504, for example 10.00, and an integrity score 506, for example 6.79. Further, the industry assumed total impact calculation 500 may have an applicability value, for example if there is applicability to value may be 1. Finally, a total assumed impact score 510 may be found by combining the confidentiality score 502, availability score 504, and integrity score 506, and multiplying by the applicability value 508. For example, (average (3.57, 10.00, 6.79)*1)=6.79.

In an exemplary embodiment there may be an operator defined industry selection. The operator selected industry may determine which industry baseline and industry assumed impacts are used for impact. A multi-industry selection may also be allowed, which may, for example, allow for a percent breakout amongst multiple applicable industry verticals.

In an exemplary embodiment there may be operator defined asset applicability, operator defined impact selection, operator defined confidentiality, and/or operator defined availability inputs. Operator selections, industry impacts, or some combination thereof may be used to determine impact measurements. Non-applicable inputs may be tuned out from the impact measurements, and an impact model may be generated.

In an exemplary embodiment the results of the impact model may be displayed the operator. These determinations may be made automatically, on a one time or regular basis, and may be made by automatic means such as artificial intelligence. For example, if IP is determined to be an asset, then technology may be utilized to wrap the asset with specific data policies to better protect it. In another example technology may be used to track the movement of IP from one asset to another and automatically update associated impact values. Furthermore, regular determinations may be combined to, for example, generate threat trends based on shifts in historical and cyber risk intelligence threat data and operator defined impact data.

In an exemplary embodiment the system, method, and apparatus for measuring, modeling, reducing, and addressing cyber risk may contain a process for determining inherent risk. The inherent risk process may be just one component of the entire system, method, and apparatus for measuring, modeling, reducing, and addressing cyber risk.

In an exemplary embodiment inherent risk may be determined by multiplying the threat model results and the impact model for each risk scenario. The inherent risk may be combined to create an inherent risk model.

In an exemplary embodiment the results of the inherent risk model may be displayed to the operator. The model may be used to prepare visual aids of various trends, for example, historical trends, maximum threat per threat category graphs, aggregate threat per threat category graphs, and/or top 5 threat scenarios. These determinations may be made automatically, on a one time or regular basis, and may be made by automatic means such as artificial intelligence. Furthermore, regular determinations may be combined to, for example, generate threat trends based on shifts in historical and cyber risk intelligence threat data and operator defined threat data.

In an exemplary embodiment the inherent risk model may be used to automatically address inherent risk. For example, if the inherent risk is determined to be above a certain threshold value, related assets or record type association with high inherent risk may be automatically reduced. In another example, if the inherent risk is above a certain threshold value, monitoring or blocking software to target the relate threat may be automatically implemented by the system. In other situations, when high inherent risk is detected an enterprise may directly and automatically target the threat condition and/or impact condition, for example through a use of one or more of zero trust, data loss prevention, end point protection, DDOS mitigation, or any other technology known by a person of ordinary skill in the art. In other circumstances an enterprise may automatically purge or transfer a certain amount or type of records, high risk assets, automatically reduce internet presence, or modify or remove other profile elements to mitigate the high inherent risk.

In an exemplary embodiment the system, method, and apparatus for measuring, modeling, reducing, and addressing cyber risk may contain a process for determining control effectiveness. The control effectiveness process may be just one component of the entire system, method, and apparatus for measuring, modeling, reducing, and addressing cyber risk.

Figure 6:
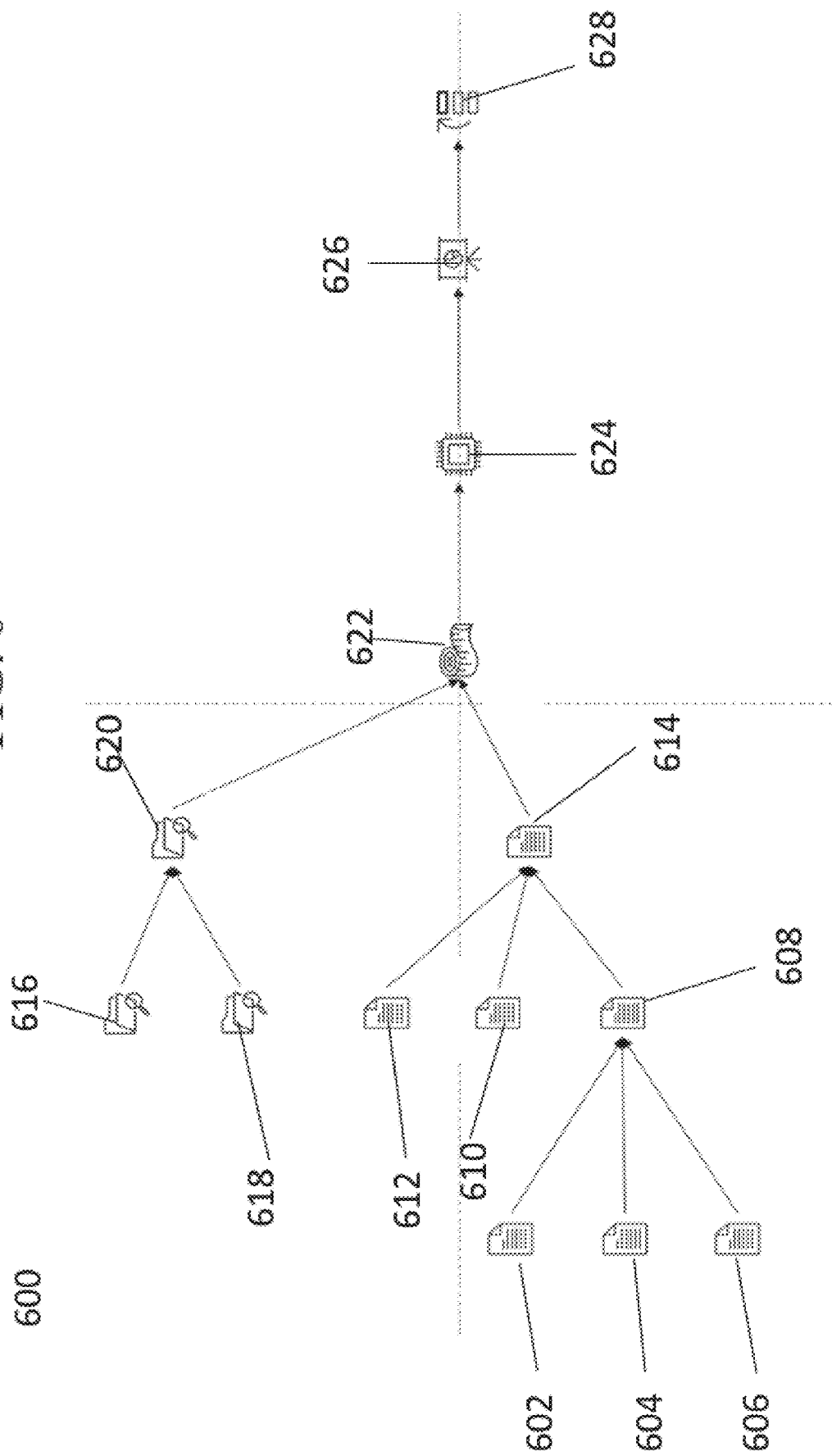
FIG. 6 is an illustration of an overview of an exemplary system, method, and apparatus for measuring and modeling control effectiveness and reducing control deficiency.

FIG. 6 shows an illustration of an overview of an exemplary system, method, and apparatus for measuring and modeling control effectiveness and reducing control deficiency 600. The system for modeling control effectiveness 600 may include operator defined macro control implementation data 602, operator defined mezzo control implementation 604, and operator defined detailed control implementation 606, which may all be part of the operator defined control implementation 608. The operator defined control implementation 608, may be combined with operator defined asset applicability 610, and operator defined industry selection 612, to make up operator control implementation inputs 614. The System for modeling control effectiveness 600 may further include data defined industry control maturity baseline data 616 and data defined control effectiveness data 618, which may be part of historical and cyber risk intelligence control effectiveness data 620. The intelligence control data 620 and the operator implementation inputs 614 may be used to determine control effectiveness measurements 622. The control effectiveness measurements 622 may be used to determine a control effectiveness model 624, which may be used to show control effectiveness results 626 and control effectiveness rankings 628.

The control effectiveness process may include a data defined industry control maturity baseline. The industry control maturity baseline may be based on an industry vertical, and historical and cyber risk intelligence data may be used to determine an annual control implementation baseline for each industry vertical amongst controls, for example among the CIS Cyber Security Controls. The control maturity baseline value may be determined on a standardized scale, for example on a scale of 0 to 5, where 5 represents an optimized maturity, and 0 represents no maturity. The control maturity baseline value may be an average value, and other values may be considered in addition to or instead, for example 25th and 75th percentile values.

In an exemplary embodiment, as a first step the control maturity value may be converted to an implementation group value, for example the 0 to 5 maturity value may be converted to a 0 to 3 implementation group value by using the formula (Maturity Value/5)×3=Implementation Group Value.

In an exemplary embodiment a second step may involve propagating the implementation group values to each of the controls to determine a baseline implementation value for each control. The implementation values may be used to show implementation of sub controls, for example An implementation group value of 1 may mean that 100% implementation group 1 sub-controls are implemented, an implementation group value of 1.5 may mean that a 100% of implementation group 1 sub-controls are implemented and 50% of implementation group 2 sub-controls are implemented, and a implementation group value of 3 may mean that 100% of implementation group 1, group 2, and group 3 sub-controls are implemented.

In an exemplary embodiment data defined control effectiveness may be determined by using historical and cyber risk intelligence data determines control effectiveness for each of the controls intersecting with each of the risk scenarios.

In an exemplary embodiment a first step may categorize historical and cyber risk intelligence incidents amongst the threat categories. Due to multi-step attack patterns, many of the incidents may be categorized into more than one threat category. A second step may categorize historical and cyber risk intelligence incidents amongst the asset categories. Due to multi-step attack patterns, many of the incidents may be categorized into more than one asset category.

In an exemplary embodiment a third step may involve finding common patterns in the incident data. For example, If the pattern ratio is 80% or greater, than the pattern may be tagged "primary". If the ratio pattern is between 5% and 15%, then the pattern may be tagged "secondary". If the ratio pattern is between 1% and 4%, then the pattern may be tagged "tertiary". Other cutoff values may be used, and more or less than three categories may be utilized.

In an exemplary embodiment a fourth step may associate each incident pattern to one or more controls. As an example, the phishing incident pattern may associate with CIS CSC #14 Security Awareness Training. Primary incident patterns may associate with primary controls, secondary incident patterns may be associated with secondary controls, and tertiary incident patterns may associate with tertiary controls. In some of the risk scenarios, certain controls may have zero control effectiveness because there is no incident pattern association.

In an exemplary embodiment a fifth step may distribute a control effectiveness value to each control for each risk scenario. This distribution may be done by, for example, evenly distributing 80% amongst all primary tagged controls, evenly distributing 15% amongst all secondary tagged controls, and evenly distributing 4% amongst all tertiary tagged controls. Other values may be used to distribute among the different tagged controls. If a control does not have a primary, secondar, or tertiary tag, then it may be assigned, for example, a 0.0% control effectiveness.

In an exemplary embodiment the data defined industry control maturity baseline and the data defined control effectiveness for control effectiveness measurement for each industry may be combined to determine data defined earned control effectiveness. The data defined earned control effectiveness may be applied to each industry and each of the risk scenarios.

In an exemplary embodiment, some values may be input by an operator. For example, an operator may input defined asset applicability, control implementation, control implementation inputs, and/or control effectiveness measurement. This process may be used in addition to other information sources such as historical and cyber risk intelligence data. A final threat measurement may be determined by combining historical and cyber risk intelligence threat data, operator threat input, and any other sources of information. The combination may be an average, weighted average, or some other combination. Control effectiveness may be determined for some or all possible risk scenarios and may be combined into a Control effectiveness grid.

In an exemplary embodiment there may be a control effectiveness model. The control effectiveness model may be a combination of the control effectiveness measurement results for each per each risk scenarios. The allocation values may be informed by, for example, historical and cyber risk intelligence data. Non-applicable risk scenarios may be given a 0 value or may be blank in order to prevent operator confusion.

In an exemplary embodiment the results of the control effectiveness model may be displayed to the operator. The model may be used to prepare visual aids of various trends, for example, historical trends, maximum control effectiveness per threat category graphs, aggregate control effectiveness per threat category graphs, and/or top 5 threat scenarios. These determinations may be made automatically, on a one time or regular basis, and may be made by automatic means such as artificial intelligence. Furthermore, regular determinations may be combined to, for example, generate control effectiveness trends based on shifts in historical and cyber risk intelligence threat data and operator defined threat data.

In an exemplary embodiment the system, method, and apparatus for measuring, modeling, reducing, and addressing cyber risk may contain a process for determining residual risk. The residual risk process may be just one component of the entire system, method, and apparatus for measuring, modeling, reducing, and addressing cyber risk.

In an exemplary embodiment there may be a residual risk model. The model residual risk may be determined by, for example, combining the inherent risk model results and the control effectiveness model results using the formula:

$$\text{Inherent Risk} \times (1 - \text{Control Effectiveness}) = \text{Residual Risk, for each of the risk scenarios.}$$

In an exemplary embodiment the results of the residual risk model may be displayed the operator. The model may be used to prepare visual aids of various trends, for example, historical trends, maximum residual risk per threat category graphs, aggregate residual risk per threat category graphs, and/or top 5 residual risk scenarios. These determinations may be made automatically, on a one time or regular basis, and may be made by automatic means such as artificial intelligence. Furthermore, regular determinations may be combined to, for example, generate residual risk trends based on shifts in historical and cyber risk intelligence residual risk data and operator defined residual risk data.

In an exemplary embodiment the residual risk model may be used to automatically address residual risk. For example, if the residual risk is determined to be above a certain threshold value, related assets or record types of association with high inherent risk may be automatically reduced. In another example, if the residual risk is above a certain threshold value, additional control measures may be automatically implemented. In other situations, the automatic deploy of controls could be one or more of automatically allow listing to reduce types of vulnerable software, automated awareness training such as mock phishing exercises, automated patch management to address vulnerabilities, and/or any other control concept known by a person of ordinary skill in the art.

In an exemplary embodiment the system, method, and apparatus for measuring, modeling, reducing, and addressing cyber risk may contain a process for determining expected loss. The expected loss process may be just one component of the entire system, method, and apparatus for measuring, modeling, reducing, and addressing cyber risk.

Figure 7:
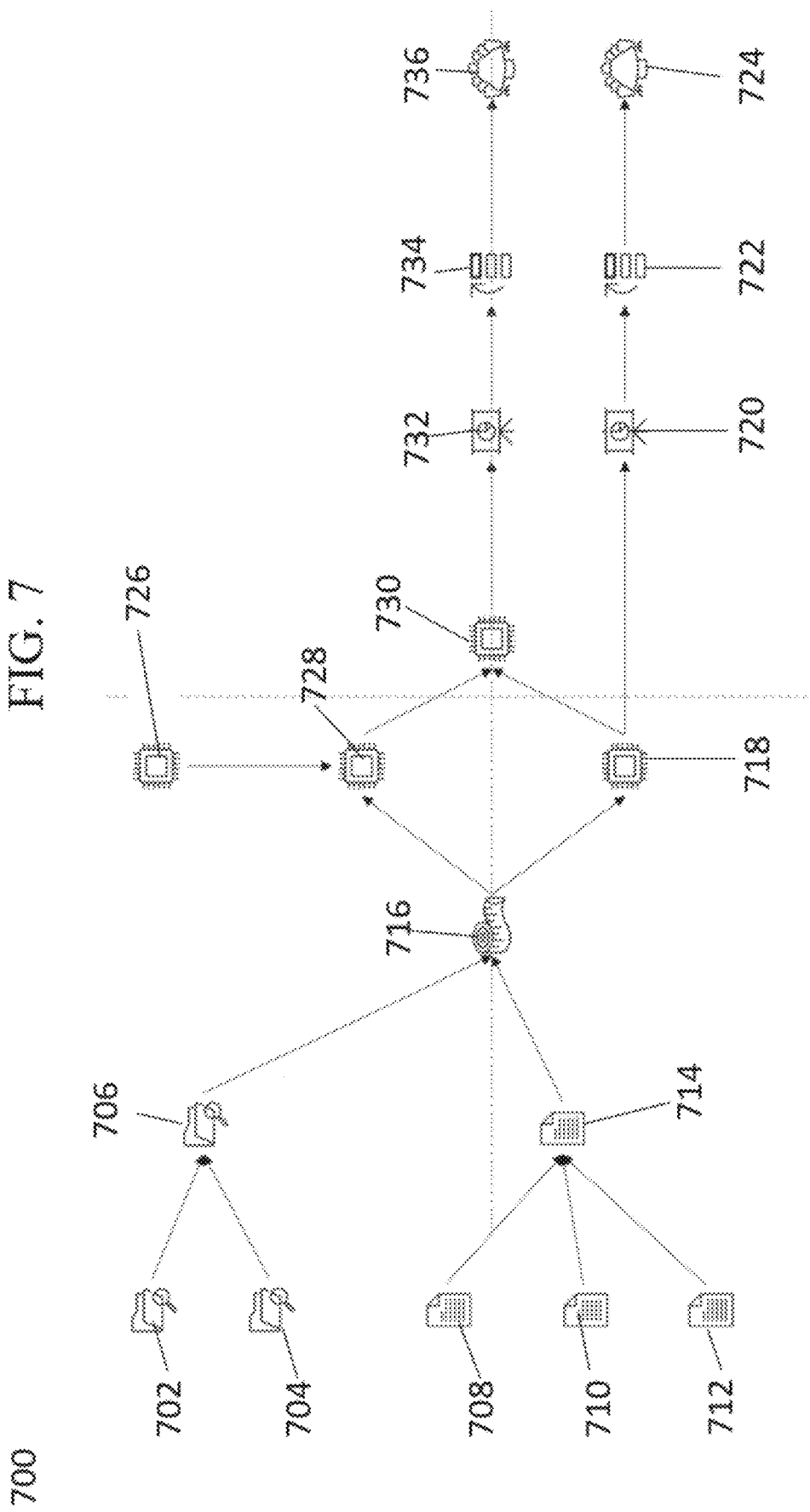
FIG. 7 is an illustration of an overview of an exemplary system, method, and apparatus for measuring, modeling, reducing, and addressing expected loss.

FIG. 7 shows an illustration of an overview of an exemplary system, method, and apparatus for measuring, modeling, reducing, and addressing expected loss 700. The system for addressing expected loss 700 may include data defined exposure probability baseline and indexes 702, and data defined exposure severity data 704, which may be part of historical & cyber risk intelligence exposure data 706. The system for addressing expected loss 700 may further include an operator defined industry selection 708, an operator defined region 710, and/or an operator defined exposure selection 712, which may all be part of operator exposure inputs 714. The intelligence exposure data 706 and the operator exposure inputs 714 may be used to determine exposure measurements 716.

The exposure measurements 716 may be used to determine a loss severity model 718, which may create a loss lookup results display 720 and/or loss lookup rankings 722 and may be used to address actual loss 724. Further the exposure measurements 716 may be combined with the output of the residual risk model 726 to create a loss probability model 728. The loss probability model 728 and the loss severity model 718 may be used to create an expected loss model 730 which may create an expected loss results display 732 and/or expected loss rankings 734 and may be used to address expected loss 736.

In an exemplary embodiment there may be major loss categories each of which may have one or more loss sub-categories. For example, the major loss categories may be data breach, business interruption, ransomware, and/or misappropriation. For an example of sub-categories, misappropriation may be further broken down into misappropriation of intellectual property, misappropriation of funds, and/or misappropriation of services. Historical and cyber risk intelligence data may be used to determine a probability baseline and modify indexes for loss categories or sub-categories.

In an exemplary embodiment, in a first step, loss category incidents may be categorized on an axis, and may further be compared to the total number of entities within a dataset to determine loss category annual baseline probability. For example, if 5 out of 10 entities in a dataset experienced a data breach per year, then the probability of data breach may be 50% per year.

In an exemplary embodiment, in a second step, incident data may be categorized by common factors, such as, for example, industry vertical and region, per loss category and sub-category to determine probability indexes. Each probability index may be converted to a ratio, for example if a business with 500 employees has a 21.2% probability of a 1,000-record data breach per year, then the 21.2% is divided by 17.7% (baseline value) to determine a 500-employee count index of 1.20. In this example, a 500-employee count enterprise has a 20% increase in probability of a data breach.

In an exemplary embodiment, in a third step, enterprise-specific probability per loss category may be determined. enterprise-specific probability may be determined by, for example multiplying the annual baseline probability by the average of the probability indexes for each enterprise attribute, such as, for example, number of records, industry vertical, geographical region, employee count, and/or revenue. The enterprise-specific probability may be determined for each loss category and/or sub-category.

In an exemplary embodiment a data defined exposure severity may be determined. Severity is the amount of damage associated with a cyber incident. As an example, a 1,000-record data breach may equate to $80,000 of damage. Historical and cyber risk intelligence data may determine a set of severity factors that may or may not related to a specific enterprise and set the basis for low, median, high, and worst-case severity. Each loss category and sub-category may have a unique set of severity factors. Severity may be determined in aggregate and/or at specific percentiles to define different severity cases.

In an exemplary embodiment an exposure measurement may be determined. The exposure measurement may be based on, for example, data defined exposure probability baseline and probability indexes and data defined exposure severity factors.

In an exemplary embodiment, some values may be inputted by an operator. For example, an operator may input defined industry selection, geographic region, exposure selection, and/or exposure inputs. This process may be used in addition to other information sources such as historical and cyber risk intelligence data. A final exposure measurement may be determined by combining historical and cyber risk intelligence threat data, operator exposure measurement inputs, and any other sources of information. The combination may be an average, weighted average, or some other combination. exposure measurement may be determined for some or all possible risk scenarios, and may be combined into a exposure measurement grid.

In an exemplary embodiment there may be a loss probability model. The loss probability model may be a combination of the threat measurement and residual risk for each loss category and sub-category. In a first step residual risk per threat category may be converted to a risk index value per threat category. Using data defined threat baseline and modifier, data defined impact assumptions, and data defined control effectiveness assumptions for all industries, a baseline average residual risk for each threat category may be determined. The enterprise-specific average residual risk value per threat category may be divided by the baseline average residual risk value per threat category to determine risk index (where formula is Average ((Residual Risk per Threat Category)/Average (Residual Risk Baseline per Threat Category)=Risk Index)). In this example a risk index value less than 1 would dampen baseline probability, a risk index equal to 1 would maintain baseline probability, and a risk index value greater than 1 would amplify baseline probability.

In an exemplary embodiment, in a second step, all applicable threat category risk indexes that map to a loss category or sub-category may be averaged.

In an exemplary embodiment, in a third step, baseline probability, including all probability indexes may be multiplied the loss category or sub-category risk index. This process may be repeated for each position on the probability axis for each loss category and sub-category. As an example, this system, method, and process may determine enterprise-specific data breach probability from 1,000 records to 10 billion records or until the record volume is no longer applicable for the enterprise.

In an exemplary embodiment the loss probability measurement model may display a completed loss table per loss category and sub-category. The loss table may be organized on the associated loss axis, for example record data breaches may be organized from smallest record volume to highest record volume. The operator may be able to view the entire loss table, like an actuarial table, or the operator may be able to perform a specific lookup, such as a direct lookup of a 30,000-record data breach.

The system, method, and apparatus for measuring, modeling, reducing, and addressing cyber risk may have a modular design that easily allows for interchangeable and replicated components. Additionally, module replication may provide a means of conducting what-if simulations. As an example, a replication of the impact model provides a means to understand how a confidentiality, integrity, and availability change would alter downstream results for reducing and addressing cyber risk before the change takes places. As a second example, a replication of the control effectiveness model provides a means to understand how a control change would alter downstream results for reducing and addressing cyber risk before the change takes places. Module replication (or what-if simulations) may empower the operator to anticipate potentials changes, forecast future cyber risk, rank controls based on most expected loss improvement, and many other changes that allow for the best allocation of finite budget and other finite enterprise resources.

In an exemplary embodiment the system, method, and apparatus for measuring, modeling, reducing, and addressing cyber risk may contain a control effectiveness simulation model. The control effectiveness simulation model may be just one component of the entire system, method, and apparatus for measuring, modeling, reducing, and addressing cyber risk.

In a first step of the control effectiveness simulation model, each control may be converted from their original implementation to an assumed implementation value from 0% to 100%, for example an assumed implementation value of 50%, or 100%. An original control prioritization may be determined, for example the distance from the original implementation value to the assumed value may serve as a basis for determining control prioritization.

In a second step of the control effectiveness simulation model, the value of the first control may be changed to the assumed value, and the control effectiveness simulation may be run using the assumed value for the first control, and the original value for all other controls, to recalculate control effectiveness.

As a third step of the control effectiveness simulation model, the value of the first control may be returned to its original value, and the second control's original value may be replaced with the assumed value, the control effectiveness simulation may be run using the assumed value for the second control, and the original value for all other controls, to recalculate control effectiveness. This process may then be repeated for any number of the remaining controls, up to all of the controls.

The control effectiveness simulation model may operate based on the following formula, where N is the number of control variables, X is the current iteration, and EV is the inputted control effectiveness value, rerun the simulation N times, each time replacing Controlx with EV.

Figure 8:
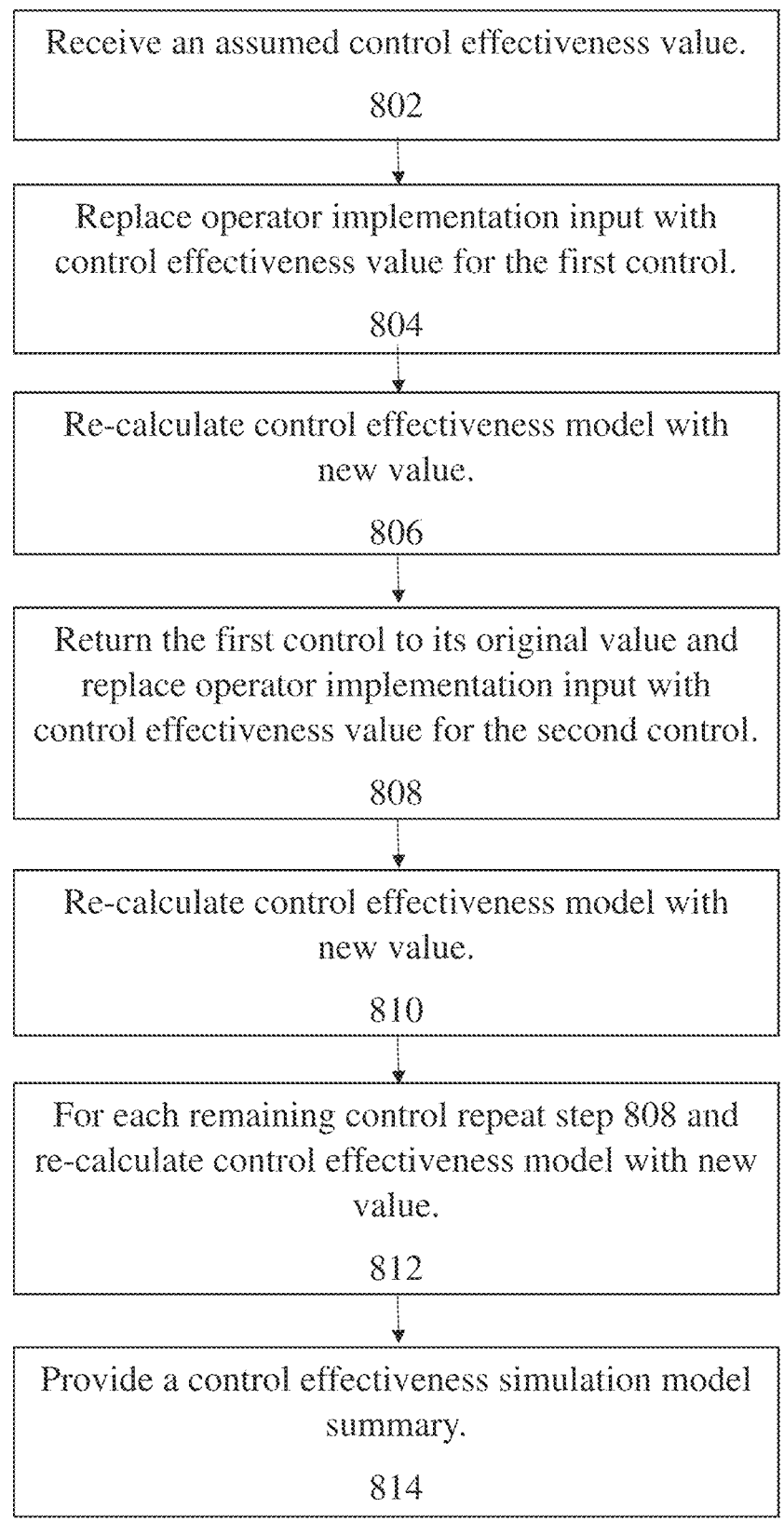
FIG. 8 is a block diagram that illustrates the steps for an exemplary control effectiveness simulation model.

FIG. 8 shows a block diagram that illustrates the steps for an exemplary control effectiveness simulation model 800. The control effectiveness simulation model 800 starts with receiving an assumed control effectiveness value 802. In a next step 804 the operator implementation input for the first control is replaced with the assumed control effectiveness value. In a next step 806 the control effective model is re-calculated using the new value for the first control. In a next step 808 the first control is returned to its original value, and the second control has its value replaced with the assumed control effectiveness value. In a next step 810 the control effectiveness model is recalculated with the new values. In a next step 812, step 808 is repeated for each remaining control, and the control effectiveness model is recalculated for each new value. In a final step 814 a control effectiveness simulation model summary is provided.

The control effectiveness simulation model may replace more than one control implementation value at a time when running a simulation, for example replacing controls 1 and 2 with the assumed value, or controls 1, 3, and 5.

In an exemplary embodiment the system, method, and apparatus for measuring, modeling, reducing, and addressing cyber risk may contain a residual risk simulation model. The residual risk simulation model may be just one component of the entire system, method, and apparatus for measuring, modeling, reducing, and addressing cyber risk.

The residual risk simulation model may use the same process as the process for determining residual risk described above but using the output of the control effectiveness simulation model and the current inherent risk model. The process may be repeated for one or more of the controls for which simulations are run, up to all the simulations.

In an exemplary embodiment the system, method, and apparatus for measuring, modeling, reducing, and addressing cyber risk may contain an expected loss simulation model. The expected loss simulation model may be just one component of the entire system, method, and apparatus for measuring, modeling, reducing, and addressing cyber risk.

The expected loss simulation model may use the same process as the process for determining expected loss described above but using the output of the residual risk simulation model. The process may be repeated for one or more of the controls for which simulations are run, up to all the simulations.

In an exemplary embodiment the results from the expected loss simulation may be compared with the current expected loss results to show the delta between the two results. This process may be repeated for each of the results from the expected loss simulation model, which may produce a list of expected loss improvement for each control. The results may be automatically ranked, for example by expected loss improvement, and may be displayed to an operator.

In an exemplary embodiment the loss probability model may be used to automatically address actual or expected loss. For example, if the actual or expected loss is determined to be above a certain threshold value, production or prices may be increased to help reclaim the loss. In another example, if the actual or expected loss is above a certain threshold value, additional control measures may be automatically implemented. In other situations what-if simulations may be used to determine control prioritization, and an enterprise may deploy automated control concepts and decisions may be may automatically to purge or transfer certain records, ransom pay determinations may be automatically made (such as in the case of ransomware), electronic fundings decisions such as decreasing funds available made be made, and/or any other control concept as known by a person of ordinary skill in the art.

In an exemplary embodiment any of the above systems and processes may be automated to run on a regular basis, for example monthly or weekly. In additional an enterprise may integrate existing, in-house, technology, to the system, method, and apparatus. This enterprise technology may connect to the system, method, and apparatus with, for example, an inbound Application Program Interface (API) or other connective technology such as, but not limited to, event and incident volume reports from a platform like Splunk, vulnerability data from tools like Qualys, incident response ability from an MSS or MDR service, information from security awareness training like mock phishing tests, or any other operational metric or tool known to a person of ordinary skill in the art. The API may maintain a strict structure to ensure the system, method, and apparatus can receive and process the enterprise technology results. The connective technology may automatically inform the system about, for example but not limited to, potential threat monitoring solutions; asset & impact inventory solutions; compliance management or audit solutions; enterprise profile solutions such as record count, revenue, region, etc.; and/or records of actual losses suffered. As the technology informs measurement, the existing automation of the system, method, and apparatus will process at the speed of a computer processor and memory to determine newly revised results, which may inform reducing and addressing of threat, inherent risk, residual risk, expected loss, and actual loss.

In an exemplary embodiment any of the above systems may be integrated into an enterprises existing system with an outbound API or other connective technology. The API maintains a strict structure that ensures consistent translation and processing for the enterprise. As the system, method, and apparatus determines newly revised results for reducing and addressing threat, inherent risk, residual risk, expected loss, and actual loss, the enterprise's decisioning platforms receive those results to determine newly revised enterprise decisions in near real time. In an exemplary embodiment the apparatus results may feed into the enterprise's risk management platform to further combine cyber risk with other enterprise risks for ranking and decision making.

In an exemplary embodiment AI may be used to automatically determine future trends for factors including, but not limited to, threat, impact, inherent risk, residual risk, expected loss, and/or loss ratios. By combining historical cyber risk data and cyber risk intelligence data with operator inputs from at least two past periods of time, for example every month from a time period of 6 months or a year, future months may be predicted. In an exemplary embodiment a TREND formula such as, for example, a least squares method may be used to make predictions.

In an exemplary embodiment AI may be used to provide automatic insights, including, but not limited to, deviations between predictive values and actual values for threat, impact, inherent risk, residual risk, expected loss, and/or loss ratios. Deviations for one or more of the preceding may be calculated and may be displayed to the user in a ranked order, such as from highest to lowest deviation. Furthermore, in an exemplary the deviations between predictive values and actual values may highlight a need for an enterprise to shift risk strategy or may be used to automatically shift risk strategy.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A computer-implemented method of identifying and mitigating information security risks for at least one information system, by a computer-implemented security system, the method comprising:
   receiving a plurality of operator control implementation inputs, each of the plurality of operator control implementation inputs directed to a control in a plurality of controls, and further receiving historical and cyber risk intelligence control effectiveness data directed to one or more controls in the plurality of controls;
   automatically determining shifts in historical and cyber risk intelligence control effectiveness data by monitoring real-time data by artificial intelligence;
   updating, by artificial intelligence, the historical and cyber risk intelligence control effectiveness data based on the determined shifts;
   automatically combining, by the computer-implemented security system, the historical and cyber risk intelligence control effectiveness data and the operator control implementation input to determine a control effectiveness measurement result for each of a plurality of risk scenarios, wherein the plurality of controls includes at least one control intersecting with each risk scenario in the plurality of risk scenarios;
   aggregating, by the computer-implemented security system, the determined control effectiveness measurement results for each of the plurality of controls for the plurality of risk scenarios;
   generating, by the computer-implemented security system, a control effectiveness grid based on the aggregated control effectiveness measurement results;
   generating, by the computer-implemented security system, a control effectiveness simulation model by:
      determining, by artificial intelligence, an assumed control effectiveness value;
      running, by the computer-implemented security system, a what-if simulation for each control in the plurality of controls, wherein the running of the what-if simulation for each control comprises, for each of the plurality of controls, re-determining the control effectiveness grid by replacing the operator control implementation input with the assumed control effectiveness value different from the operator control implementation input, and comparing a first result based on the operator control implementation input with a second result based on the assumed control effectiveness value;
      wherein re-determining the control effectiveness grid comprises determining simulated control effectiveness measurement results for simulated risk scenarios, aggregating the simulated control effectiveness measurement results, and generating a re-determined control effectiveness grid based on aggregation of the simulated control effectiveness measurement results; and
      outputting, by the computer-implemented security system, a control effectiveness simulation model summary;
   after generating the control effectiveness simulation model, automatically determining, by the artificial intelligence, a result from the control effectiveness simulation model and automatically implementing, by the artificial intelligence, at least one control in the plurality of controls based on a result generated by the control effectiveness simulation model.

2. The method of claim 1, wherein the control effectiveness simulation model summary comprises a plurality of re-determined control effectiveness grids displayed in a ranked order, wherein the ranked order is based on a difference between the operator control implementation input and the assumed control effectiveness value.

3. The method of claim 2, further comprising:
   automatically implementing the at least one control when the control effectiveness simulation shows an improvement of more than a predetermined threshold.

4. The method of claim 2, further comprising:
   generating the control effectiveness simulation model automatically on one of a weekly, monthly, quarterly, or yearly basis.

5. The method of claim 4, wherein the simulation model summary is at least one of a historical trends graph, maximum control effectiveness per threat category graphs, aggregate control effectiveness per threat category graphs, and a top 5 threat scenarios graph.

6. The method of claim 2, further comprising:
automatically retrieving the operator control implementation inputs and the historical and cyber risk intelligence control effectiveness data from an external source.

7. The method of claim 4, further comprising:
automatically combining the historical cyber risk data and cyber risk intelligence data with the operator inputs from at least two or more predetermined past periods of time to determine a predictive control effectiveness value for at least one future period of time; and
outputting the predictive control effectiveness value for the at least one future period of time.

8. The method of claim 7, further comprising:
automatically calculating a deviation value between the predictive control effectiveness value for the at least one future period of time and the control effectiveness simulation model; and
outputting the deviation between the predictive control effectiveness value and the control effectiveness simulation model.

9. A computer-implemented security system for identifying and mitigating information security risks for at least one information system, the system comprising:
at least one processor; and
at least one memory having instructions stored thereon executed by the at least one processor to:
receive, at the computer-implemented security system, a plurality of operator control implementation inputs, each of the plurality of operator control implementation inputs directed to a control in a plurality of controls, and further receiving historical and cyber risk intelligence control effectiveness data directed to one or more controls in the plurality of controls;
automatically determine, by artificial intelligence, shifts in historical and cyber risk intelligence control effectiveness data by monitoring real-time data;
automatically update, by artificial intelligence, the historical and cyber risk intelligence control effectiveness data based on the determined shifts; combine, with the computer-implemented security system, the historical and cyber risk intelligence control effectiveness data and the operator control implementation input to determine a control effectiveness measurement result for each of a plurality of risk scenarios, wherein the plurality of controls includes at least one control intersecting with each risk scenario in the plurality of risk scenarios;
aggregate, with the computer-implemented security system, the determined control effectiveness measurement results for each of a plurality of controls for the plurality of risk scenarios;
generate, with the computer-implemented security system, a control effectiveness grid based on the aggregated control effectiveness measurement results;
generate, with the computer-implemented security system, a control effectiveness simulation model by:
determine, by artificial intelligence, an assumed control effectiveness value;
running, with the computer-implemented security system, a what-if simulation for each control in the plurality of controls, wherein the running of the what-if simulation for each control comprises, for each of the plurality of controls, re-determining the control effectiveness grid by replacing the operator control implementation input with the assumed control effectiveness value different from the operator control implementation input, and comparing a first result based on the operator control implementation input with a second result based on the assumed control effectiveness value;
wherein re-determining the control effectiveness grid comprises determining simulated control effectiveness measurement results for simulated risk scenarios, aggregating the simulated control effectiveness measurement results, and generating a re-determined control effectiveness grid based on aggregation of the simulated control effectiveness measurement results; and
outputting, with the computer-implemented security system, a control effectiveness simulation model summary; and
after generating the control effectiveness simulation model, automatically determine with the artificial intelligence, a result from the control effectiveness simulation model and automatically implement at least one control in the plurality of controls based on a result generated by the control effectiveness simulation model.

10. The system for identifying and mitigating information security risks for at least one information system of claim 9, wherein the control effectiveness simulation model summary comprises a plurality of re-determined control effectiveness grids displayed in ranked order; and
wherein the ranked order is based on a difference between the operator control implementation input and the assumed value.

11. The system for identifying and mitigating information security risks for at least one information system of claim 10, wherein the memory is further configured to automatically implement the at least one control when the control effectiveness simulation shows an improvement of more than a predetermined threshold.

12. The system for identifying and mitigating information security risks for at least one information system of claim 10, wherein the memory is further configured to generate the control effectiveness simulation model automatically on one of a weekly, monthly, quarterly, or yearly basis.

13. The system for identifying and mitigating information security risks for at least one information system of claim 12, wherein the simulation model summary is at least one of a historical trends graph, maximum control effectiveness per threat category graphs, aggregate control effectiveness per threat category graphs, and a top 5 threat scenarios graph.

14. The system for identifying and mitigating information security risks for at least one information system of claim 10, wherein the operator control implementation inputs and historical and cyber risk intelligence control effectiveness data are retrieved automatically from an external source.

15. The system for identifying and mitigating information security risks for at least one information system of claim 12, wherein the memory is further configured to automatically combine the historical cyber risk data and cyber risk intelligence data with the operator inputs from at least two or more predetermined past periods of time to determine a predictive control effectiveness value for at least one future period of time; and
output the predictive control effectiveness value for the at least one future period of time.

16. The system for identifying and mitigating information security risks for at least one information system of claim 12, wherein the memory is further configured to automatically calculate a deviation value between the predictive control effectiveness value for the at least one future period of time and the control effectiveness simulation model; and output the deviation between the predictive control effectiveness value and the control effectiveness simulation model.

17. The method of claim 1, further comprising predicting a future cyber risk condition by combining, by the artificial intelligence, current risk conditions, current historical and cyber risk intelligence control effectiveness data, and the shifts in historical and cyber risk intelligence control effectiveness data;

determining a plurality of future cyber risk condition controls corresponding to the future cyber risk condition; and rerunning, with the computer-implemented security system, a future cyber risk simulation for each control in the plurality of future cyber risk condition controls.

18. The system of claim 9, wherein the memory is further configured to predict a future cyber risk condition by combining, by the artificial intelligence, current risk conditions, current historical and cyber risk intelligence control effectiveness data, and the shifts in historical and cyber risk intelligence control effectiveness data;

determine a plurality of future cyber risk condition controls corresponding to the future cyber risk condition; and rerun, with the computer-implemented security system, a future cyber risk simulation for each control in the plurality of future cyber risk condition controls.

19. The method of claim 1, wherein comparing the first result based on the operator control implementation input with the second result based on the assumed control effectiveness value comprises computing a delta between the first result and the second result to determine an expected loss improvement, and adding the expected loss improvement to a plurality of expected loss improvements; and wherein the method further comprises presenting a ranked list of the plurality of expected loss improvements to an operator.

20. The system of claim 9, wherein comparing the first result based on the operator control implementation input with the second result based on the assumed control effectiveness value comprises computing a delta between the first result and the second result to determine an expected loss improvement, and adding the expected loss improvement to a plurality of expected loss improvements; and wherein the processor is further configured to present a ranked list of the plurality of expected loss improvements to an operator.

* * * * *